(12) United States Patent
Zurek et al.

(10) Patent No.: US 6,636,750 B1
(45) Date of Patent: Oct. 21, 2003

(54) SPEAKERPHONE ACCESSORY FOR A PORTABLE TELEPHONE

(75) Inventors: Robert A. Zurek, Antioch, IL (US); Thomas Gitzinger, Woodstock, IL (US); Michael Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/419,234

(22) Filed: Oct. 15, 1999

(51) Int. Cl.[7] ................................................. H04M 1/00
(52) U.S. Cl. ............................. 455/569.1; 379/388.01; 379/420.02; 381/338; 381/351; 381/353
(58) Field of Search ........................... 455/569.1, 569.2, 455/90.3, 350; 379/420.01, 420.02, 420.03, 432, 388.01, 388.02, 388.07; 381/338, 351, 353, 166

(56) References Cited

U.S. PATENT DOCUMENTS

| | | | |
|---|---|---|---|
| 4,189,627 A | * | 2/1980 | Flanagan ..................... 179/180 |
| 5,109,402 A | | 4/1992 | Anderson et al. |
| 5,333,176 A | | 7/1994 | Burke et al. |
| 5,367,556 A | | 11/1994 | Marui et al. |
| 5,588,041 A | | 12/1996 | Meyer, Jr. et al. |
| 5,655,017 A | | 8/1997 | Fishman |
| 5,790,679 A | | 8/1998 | Hawker et al. |

6,493,456 B1 * 12/2002 Hansson ..................... 381/345

FOREIGN PATENT DOCUMENTS

| | | |
|---|---|---|
| DE | 19726595 | 12/1998 |
| GB | 2333004 | 7/1999 |
| GB | 2337394 | 11/1999 |
| GB | 2337890 | 12/1999 |
| WO | WO97/47117 | 12/1998 |

* cited by examiner

Primary Examiner—Lee Nguyen
(74) Attorney, Agent, or Firm—Sylvia Chen; Roland K. Bowler, II

(57) ABSTRACT

A speakerphone accessory (100) is provided for use with a portable telephone (102). The speakerphone accessory (100) has a high-level speaker assembly (222) that includes a transducer (500) coupled to first and second resonators (502, 504). The first and second resonators (502, 504) are designed so that the first resonator (502) is most efficient at a high frequency while the second resonator (504) has maximum response at a low frequency. The frequency ranges produced by the first and second resonators (502, 504) overlap to reproduce frequencies between the high and low frequencies. The high-level speaker assembly (222), therefore, provides an acoustic bandpass having improved response when compared to the response of the transducer (500) alone. In addition, the speakerphone accessory (100) has a housing (130) and porting structure which allows the accessory (100) and attached portable telephone (102) to be used in a variety of positions without obstructing sound generated by the high-level speaker assembly (222).

20 Claims, 4 Drawing Sheets

SPEAKERPHONE ACCESSORY FOR A PORTABLE TELEPHONE

FIELD OF THE INVENTION

The present invention generally relates to portable telephones, and more particularly to speakerphone accessories for such devices.

BACKGROUND OF THE INVENTION

Radio frequency communication systems, such as portable telephone systems, permit a user to communicate from locations within a broad geographic coverage area. Portable telephones generally have a compact size so that the user may more easily carry the telephone, and typically include a housing containing a transceiver circuit, a microphone, a low-level speaker, and a user interface. The user interface includes a keypad and a display. The low-level speaker is designed to produce sounds which are audible in a private mode, when the user positions the portable telephone with the low-level speaker near the user's ear. A rechargeable battery attached to the housing typically powers the portable telephone. The battery has a limited life, and therefore the portable telephone is designed to operate at low power to increase the time period between battery recharging.

A hands-free accessory is an attachable external apparatus that allows the portable telephone to function in a manner similar to a conventional speakerphone. The hands-free accessory typically includes a larger speaker to produce sounds that are audible during speakerphone mode, in which the user's ear is positioned a greater distance from the portable telephone than during private mode. As a result, the user has free use of his or her hands for other activities, such as taking notes, during a call. A conventional accessory typically includes a speaker requiring a separate source of power, and therefore the accessory is bulky and requires additional batteries or connection to an additional or alternate source of power.

A portable speakerphone is known which incorporates a speaker and other hands-free components for use as a speakerphone. The hands-free components are integrated into the speakerphone, and therefore are not provided as an auxiliary feature that may be added to an existing portable telephone. As a result, the portable speakerphone is less compact. Also, if a user already has a portable telephone, a portable speakerphone is overly costly in that it requires the purchase of an additional telephone, rather than simply an accessory attachable to the existing portable telephone.

Therefore, there is a need for a speakerphone accessory capable of being attached to a portable telephone and running off the power supply provided to the portable telephone.

BRIEF DESCRIPTIONS OF THE DRAWINGS

DETAILED DESCRIPTION OF THE PREFERRED EMBODIMENT

Figure 1:
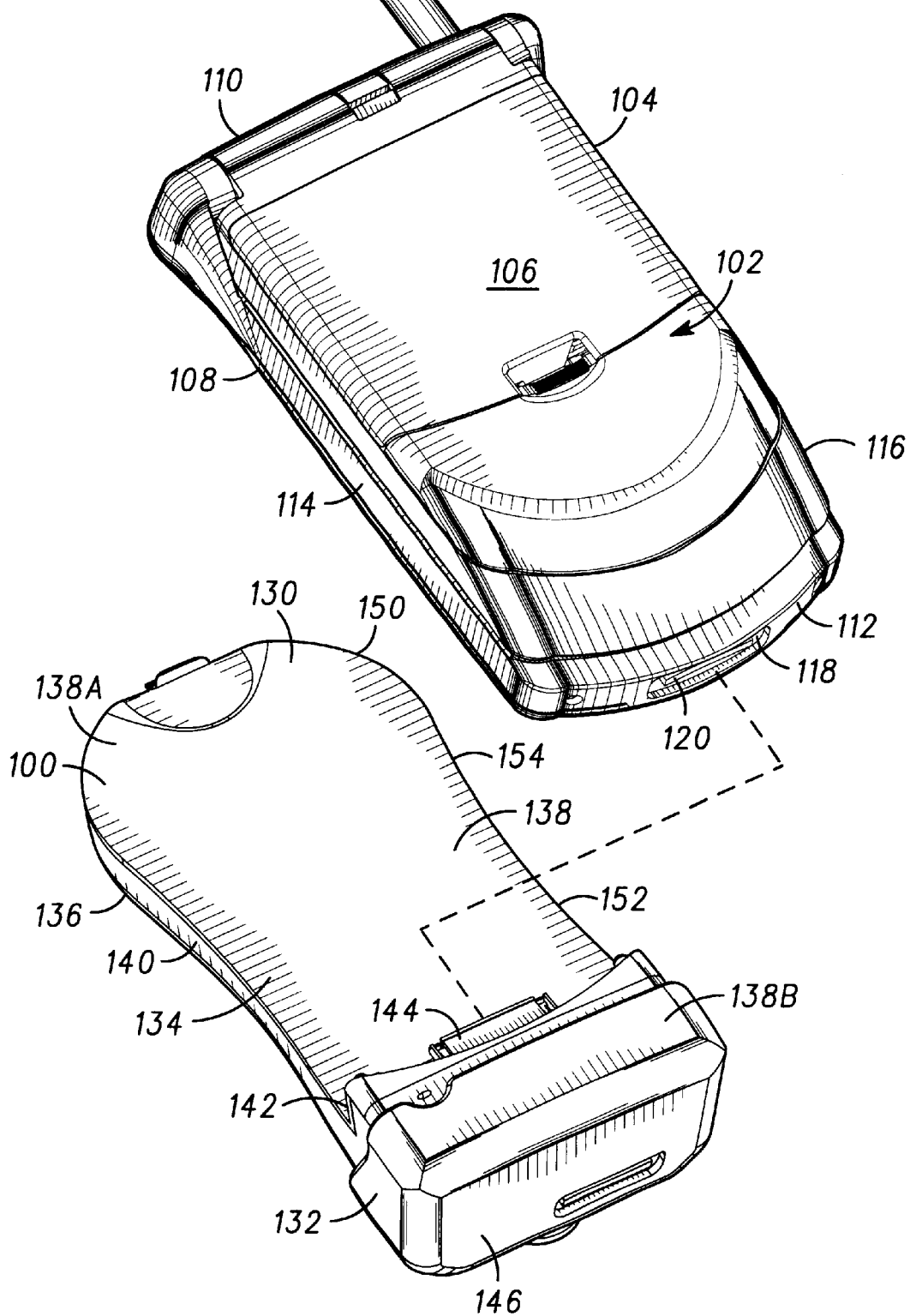
FIG. 1 is an exploded view, in perspective, of a portable telephone and a speakerphone accessory in accordance with a preferred embodiment of the present invention.

In accordance with a preferred embodiment of the present invention, and with reference to FIG. 1, a speakerphone accessory 100 is adapted for attachment to a portable telephone 102. The portable telephone 102 has a telephone housing 104 which includes a front wall 106, rear wall 108, top wall 110, bottom wall 112, left side wall 114, and right side wall 116. A connection recess 118 is formed in the bottom wall 112, and an input/output (I/O) port 120, such as a cable port, pin connector, or other type of connection interface, is disposed inside the connection recess 118. The speakerphone accessory 100 includes an accessory housing 130 having a relatively thick base portion 132 and a relatively thin body portion 134. The accessory housing 130 includes a rear accessory wall 136 and a front accessory wall 138 having an upper portion 138a and a lower portion 138b. A side accessory wall 140 extends about and connects the front accessory wall 138 and the rear accessory wall 136 to form a complete enclosure. A portion of the side accessory wall 140 forms a base of the accessory housing 130. A transition wall 142 joins the upper portion of the front accessory wall 138a to the lower portion of the front accessory wall 138b and divides the base portion 132 from the body portion 134. The transition wall 142 is preferably curved to form a cradle for the bottom wall 112 of the telephone. A connection port 144 extends upwardly from inside the base portion 132 of the accessory housing 130 and through the transition wall 142 and is formed to mate with the I/O port 120 of the portable telephone 102. The connection port 144 could be replaced with a series of spring-loaded retractable pins on the accessory housing 130 that mate with contact pads mounted on the exterior of the telephone housing 104.

To attach the speakerphone accessory 100 to the portable telephone 102, a user positions the upper portion of the front accessory wall 138a adjacent the rear wall 108 so that the base portion 132 of the speakerphone accessory 100 is spaced from the bottom wall 112 of the telephone. The user then slides the speakerphone accessory 100 upwardly along the rear wall 108 of the telephone until the connection port 144 engages the I/O port 120.

Figure 2:
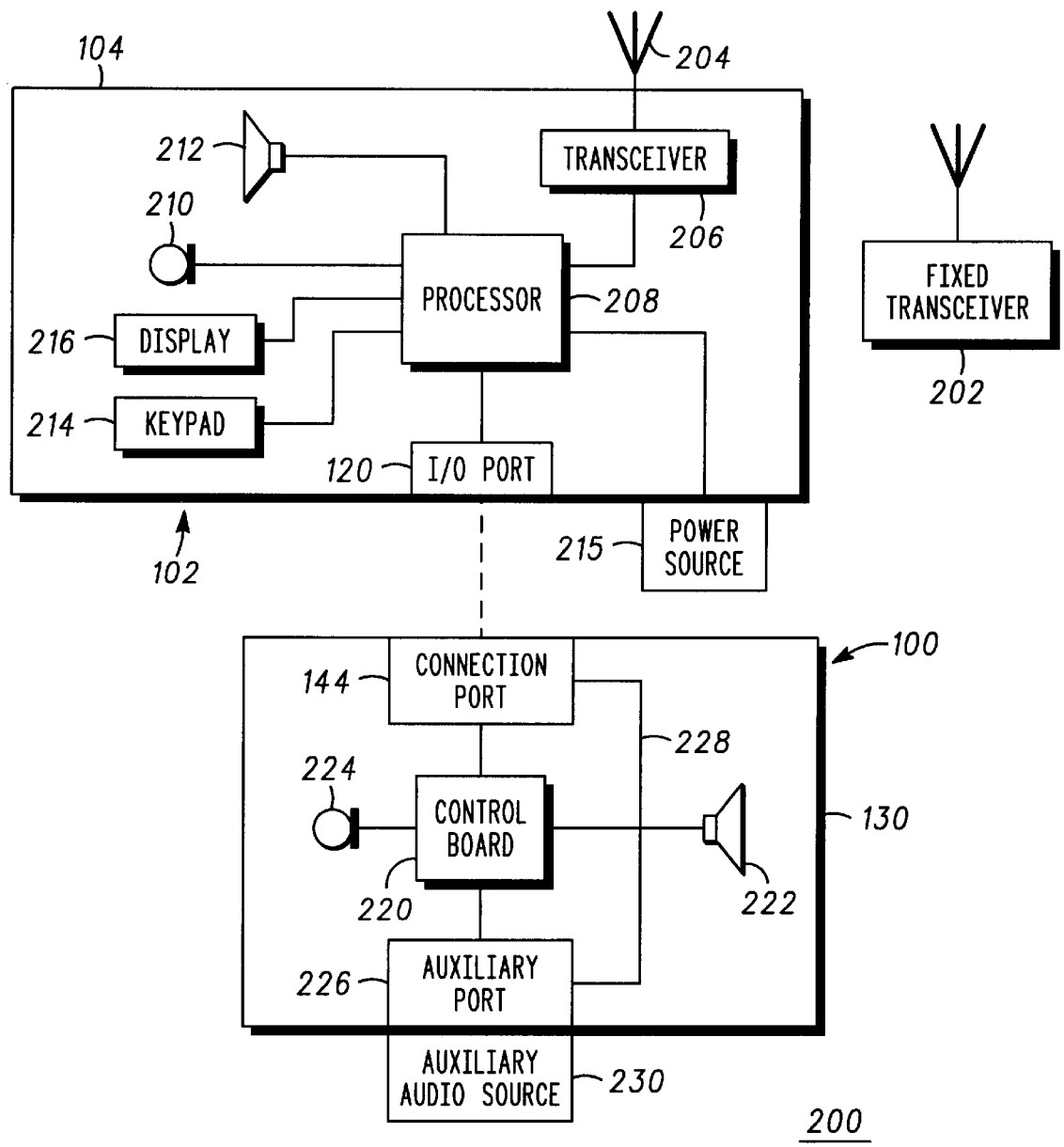
FIG. 2 is a circuit block diagram illustrating a portable telephone communication system including a speakerphone accessory attached to a portable telephone.

FIG. 2 is a circuit block diagram illustrating a portable telephone communication system 200 including the speakerphone accessory 100 attached to the portable telephone 102. The portable telephone communication system 200 typically includes a fixed transceiver 202, such as a cellular base station, but could also include a non-stationary transceiver such as a satellite, that sends out radio frequency (RF) signals to portable telephones contained within its geographic coverage area. The portable telephone 102 includes an antenna 204 extending through the telephone housing 104 and connected to a transceiver 206. The transceiver 206 is operably connected to a processor 208. The portable telephone 102 further has a microphone 210, a low-level speaker 212, and a user interface which includes a keypad 214 and a display 216, all of which are connected to the processor 208. The I/O port 120 is also connected to the processor 208. In addition, a portable power source 215, such as an externally-mounted removable battery, is connected to the processor 208 and provides power to the portable telephone 102. In the preferred embodiment, the processor 208 includes echo cancellation software for reducing echo and feedback during operation of the portable telephone 102.

During operation of the portable telephone 102, the antenna 204 is used to transmit and receive RF signals to and from the fixed transceiver 202. RF signals are received by the antenna 204 and are coupled to a receiver portion of the transceiver 206. The receiver portion of the transceiver 206 demodulates the received RF signals, converts the demodulated RF signals into data signals, and couples the data signals to the processor 208. The received data signals, which are now usable by the rest of the portable telephone 102, may contain audio data that is to be coupled to the speakerphone accessory 100, as described in greater detail below.

In the embodiment illustrated in FIG. 2, a control board 220 is disposed inside the accessory housing 130 and is coupled to the connection port 144. A high-level speaker assembly 222 is also disposed inside the accessory housing 130 and is coupled to the control board 220. Unlike the low-level speaker 212 mounted in the portable telephone 102, which is sized to produce a volume suitable for reception by an ear of the user when positioned closely thereto, the high-level speaker assembly 222 is sized to produce a greater volume that may be detected by a more distantly-spaced user. In the illustrated embodiment, the speakerphone accessory 100 also includes a microphone 224 coupled to the control board 220.

Figure 3:
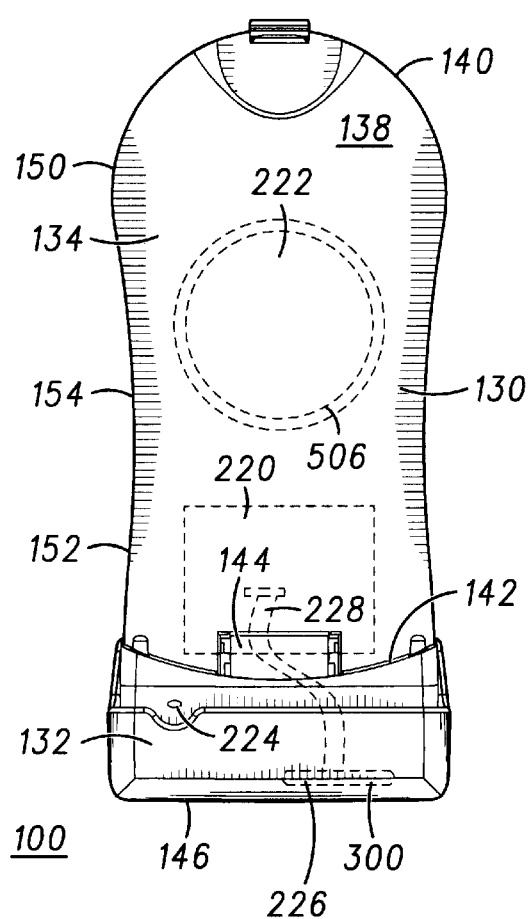
FIG. 3 is a front view of a speakerphone accessory in accordance with the preferred embodiment of the present invention.
Figure 4:
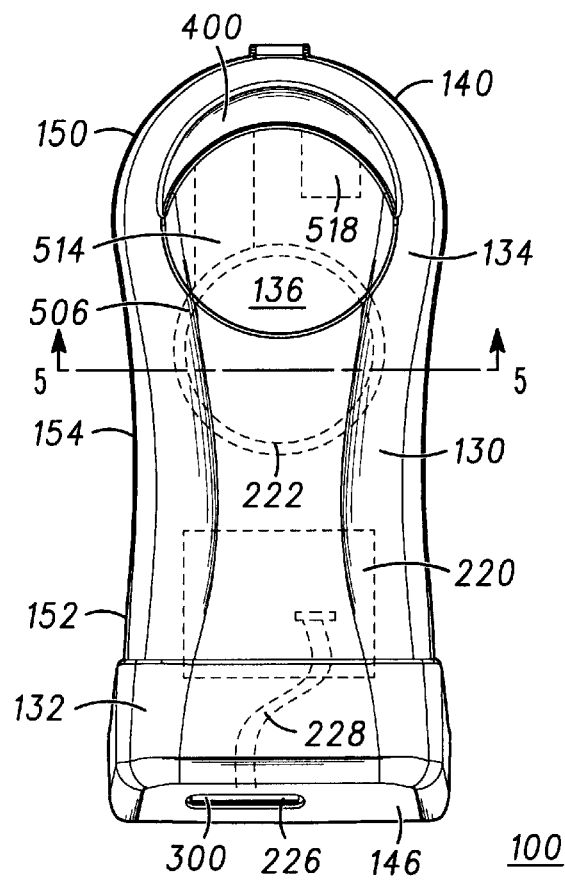
FIG. 4 is a rear view of a speakerphone accessory in accordance with the preferred embodiment of the present invention.

The speakerphone accessory 100 also preferably includes an auxiliary port 226 which allows additional accessories to be attached thereto, as best illustrated in FIGS. 2–4. The auxiliary port 226 is disposed in an auxiliary recess 300 (FIG. 3) formed in the bottom accessory wall 146, and a pass-through connection 228 (FIG. 2) couples the auxiliary port 226 to the connection port 144. The auxiliary port 226 is preferably the same type of connection interface as the I/O port 120 and connection port 144. For example, if the I/O port 120 and the connection port 144 are cable ports, the auxiliary port 226 is also a cable port.

In operation, the data signals received by the processor 208 of the portable telephone 102 are also usable by the speakerphone accessory 100, and may contain audio data that is to be coupled to the control board 220. Audio data received by the control board 220 is amplified and reproduced through the high-level speaker assembly 222 which directs the reproduced audio through an audio recess 400 (FIG. 4) formed in the rear accessory wall 136. The user may respond to the audible output by speaking in the direction of the speakerphone accessory 100. Audio signals received at the accessory microphone 224 are converted into audio data that is coupled to a transmitter portion of the transceiver 206 through the control board 220, connection port 144, I/O port 120, and processor 208. The transmitter portion of the transceiver 206 modulates and amplifies the audio data into RF signals that are radiated from the antenna 204. When the speakerphone accessory 100 is attached to the portable telephone 102, the user interface (which includes the keypad 214 and display 216) is connected to the control board 220 of the speakerphone accessory 100 through the processor 208, I/O port 120, and connection port 144. In the preferred embodiment, the user interface controls various features of the speakerphone accessory 100, such as the volume level of the high-level speaker assembly 222, and whether the speakerphone accessory 100 is on or off.

While the speakerphone accessory 100 in the embodiment illustrated and described above includes an accessory microphone 224, it will be appreciated that the accessory microphone 224 may be omitted if modifications are made to the portable telephone 102. As noted above, the portable telephone 102 has its own microphone 210 that may be used during speakerphone mode. The microphone gain controlled by the processor 208 must, however, be increased, since the user will typically be positioned farther away from the telephone during speakerphone mode than during private mode. While this alternative removes a component from the speakerphone accessory 100, thereby making it less expensive and reducing power consumption by the accessory, it makes the accessory less backwards compatible with most existing portable telephones by requiring modifications to the portable telephones. On the other hand, it will be appreciated that by using the microphone 210 in the portable telephone 102, improved echo cancellation is achieved because the microphone 210 and high-level speaker assembly 222 are enclosed in separate housing structures.

In addition, the above-described embodiments use echo cancellation software incorporated into the portable telephone 102. In an alternative embodiment, the speakerphone accessory 100 itself includes its own echo cancellation software. By providing echo cancellation software in the speakerphone accessory 100, the accessory is made more backwards compatible with existing portable telephones since the echo cancellation software in the portable telephone 102 need not be modified.

Figure 5:
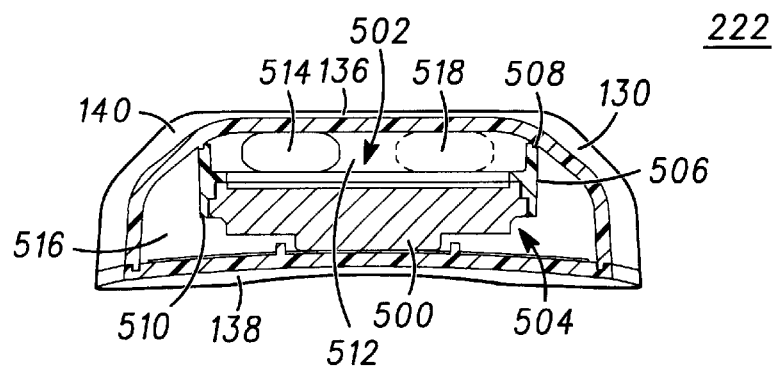
FIG. 5 is a cross-section view taken along line 5—5 of FIG. 4.

According to certain aspects of the present invention best illustrated in FIG. 5, the high-level speaker assembly 222 includes a transducer 500 coupled to first and second resonators 502, 504. A central wall 506, which is cylindrical in the illustrated embodiment (as best shown in FIGS. 3 and 4), extends from the rear accessory wall 136 and has a first end 508 which is closed off by the rear accessory wall 136 and an open second end 510. The transducer 500 is attached to and closes off the second end 510 of the central wall 506 to form a complete inner enclosure defining a first acoustic chamber 512. The first acoustic chamber 512 is connected to the audio recess 400 by a first acoustic port 514 (FIGS. 4 and 5). As noted above, the front accessory wall 138, rear accessory wall 136, and side accessory wall 140 define the accessory housing 130 to form a complete enclosure. Accordingly, a second acoustic chamber 516 is formed outside of the central wall 506, between the central wall 506 and the accessory housing 130. The second acoustic chamber 516 is connected to the audio recess 400 by a second acoustic port 518 (FIGS. 4 and 5). The first resonator 502, therefore, includes the first acoustic chamber 512 and first acoustic port 514, and is coupled to a first side of the transducer 500. The second resonator 504 includes the second acoustic chamber 516 and second acoustic port 518 and is coupled to a second, opposite side of the transducer 500. The first and second resonators 502, 504 of the illustrated embodiment are, therefore, formed as Helmholtz resonators.

It will be appreciated that while an acoustic chamber having specific size dimensions produces sounds across a range of frequencies, it is most efficient at a specific frequency. In general, large acoustic chambers efficiently produce lower frequency sounds while small acoustic chambers efficiently produce higher frequency sounds. Adjustment of the acoustic chamber dimensions therefore affects the frequency response of the transducer. Furthermore, the length and size of the acoustic port attached to the acoustic chamber affects the cavity tuning and thus the acoustic frequency response. To obtain a high-efficiency speakerphone, therefore, each resonator must be tuned to a specific frequency range and amplitude by adjusting the dimensions of the acoustic chamber and the length and size of the acoustic port.

Figure 6:
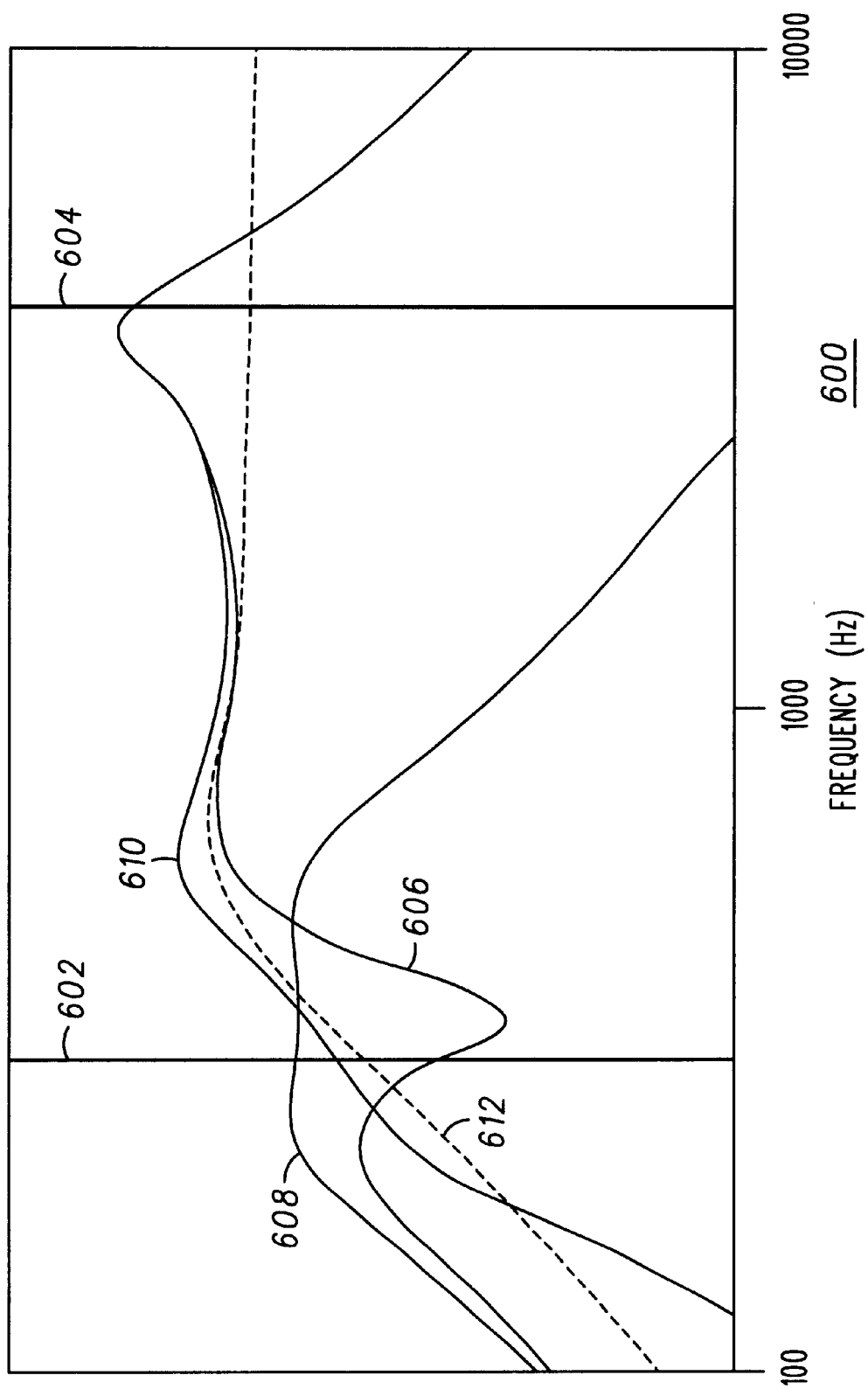
FIG. 6 is a graph illustrating an acoustic frequency response for a high-level speaker assembly incorporated in a speakerphone accessory in accordance with a preferred embodiment of the present invention and a conventional speaker.

In accordance with certain aspects of the present invention, the first and second resonators 502, 504 are tuned to high and low frequencies, respectively, to obtain an efficient acoustic bandpass. A graph 600 showing frequency output by the first and second resonators 502, 504 is presented at FIG. 6, which depicts frequency along a horizontal axis and acoustic pressure response along a vertical axis. The range of audible frequencies is illustrated by a low frequency limit line 602 and a high frequency limit line 604. The dimensions of the first acoustic chamber 512 (FIG. 5) are sized and the length of the first acoustic port 514 is optimized so that the first resonator 502 is most efficient at a high frequency, as illustrated by a high frequency curve 606. Similarly, the dimensions of the second acoustic chamber 516 are sized and the length of the second acoustic port 518 is optimized so that the second resonator 504 is most efficient at a low frequency, as illustrated by a low frequency curve 608. The responses provided by the first and second resonators 502, 504 overlap, so that both resonators provide some level of response at frequencies between the high and low efficient frequencies. Accordingly, a composite curve 610 represents the response of the combined first and second resonators 502, 504. This response is generally better than that obtained by a transducer in a traditional acoustic-suspension or bass-reflex configuration, which provides a flat but lower amplitude response across the audible range, as illustrated by the frequency response curve 612 of FIG. 6. As a result, the structural design of the first and second resonators 502, 504 improves the response of the high-level speaker assembly 222 without requiring additional electrical components or increasing power consumption. Accordingly, the speakerphone accessory 100 is adequately powered by the portable power source 215 without overly limiting the life of the power source.

It will be appreciated that the above-described high-level speaker assembly 222 may also be used to amplify additional accessories attached to the speakerphone accessory 100. An auxiliary audio source 230 (such as an MP3 player, an AM/FM radio receiver, etc.) may be incorporated into or otherwise connected to the speakerphone accessory 100 to provide an auxiliary audio signal to the control board 220 (FIG. 2). The control board 220 amplifies and reproduces the audio signal through the high-level speaker assembly 222, which efficiently produces sound that is audible at remote distances.

In accordance with further aspects of the present invention, the shape of the accessory housing 130 and structure of the audio recess 400 coupled to the high-level speaker assembly 222 allows the speakerphone accessory 100 and attached portable telephone 102 to be used in a variety of positions. As illustrated in FIGS. 1, 3, and 4, the base of the accessory housing 130 is flat and has a surface dimension sized to support the speakerphone accessory 100 and portable telephone 102 in an upright position. In addition, the audio recess 400 (FIG. 4) is formed at an edge of the rear accessory wall 136, near the side accessory wall 140, so that the first and second ports 514, 518 are accessible when the speakerphone accessory 100 is placed in a flat position, where the rear accessory wall 136 rests on a support surface such as a table. The audio recess 400, therefore, allows the high-level speaker assembly 222 to produce unimpeded audible sounds when in the flat position.

In the preferred embodiment, the accessory housing 130 is further shaped for use in a hand-held position. As best illustrated in FIGS. 1, 3, and 4, the front accessory wall 138, rear accessory wall 136, and side accessory wall 140 at the upper portion of the accessory housing 130 form a rounded head portion 150 and a generally rectangular intermediate portion 152 connected by an indented neck portion 154. The indented neck portion 154 allows a user's hand to comfortably hold the speakerphone accessory 100 and attached portable telephone 102. The audio recess 400 is formed in the head portion 150 so that a user's palm does not interfere with audible sounds produced by the high-level speaker assembly 222.

In view of the foregoing, the present invention brings to the art a new and improved speakerphone accessory for use with a portable telephone. The speakerphone accessory includes a high-level speaker assembly including first and second resonators coupled to a transducer. The high-level speaker assembly achieves an efficient acoustic bandpass by tuning the first resonator to a high frequency and the second resonator to a low frequency. The response of the high-level speaker assembly over the audible range exceeds that of a transducer alone. As a result, the high-level speaker assembly amplifies sounds generated by the transducer without requiring additional components or circuitry, making the speakerphone accessory less expensive to manufacture. In addition, the speakerphone accessory minimizes power consumption.

The speakerphone accessory of the present invention may also be operated in a variety of positions, thereby improving user convenience. Many additional changes and modifications could be made to the invention without departing from the fair scope and spirit thereof. The scope of some changes is discussed above. The scope of others will become apparent from the appended claims.

We claim:

1. A speakerphone accessory for use with a portable telephone having a power supply, a user interface, a microphone, a low-level speaker, a telephone housing, and an input/output port, the speakerphone accessory comprising:

an accessory housing sized for attachment onto the telephone housing;

a high-level speaker assembly supported inside the accessory housing, a first resonator coupled to a transducer and having a high frequency response, and a second resonator coupled to the transducer and having a low frequency response;

a control board coupled to the high-level speaker assembly, the control board including echo cancellation software; and a connection port coupled to the control board and positioned for connection to the input/output port when the accessory housing is attached to the telephone housing.

2. The speakerphone accessory of claim 1, wherein the first resonator comprises a first acoustic chamber coupled to a first side of the transducer, and a first acoustic port coupled to the first acoustic chamber.

3. The speakerphone accessory of claim 2, wherein the second resonator comprises a second acoustic chamber coupled to a second side of the transducer, and a second acoustic port coupled to the second acoustic chamber.

4. The speakerphone accessory of claim 3, wherein dimensions of the first acoustic chamber and a length of the first acoustic port are sized to provide a high frequency response.

5. The speakerphone accessory of claim 3, wherein dimensions of the second acoustic chamber and a length of the first acoustic port are sized to provide a low frequency response.

6. The speakerphone accessory of claim 1, further comprising an auxiliary audio source coupled to the control board.

7. The speakerphone accessory of claim 1, wherein the user interface of the portable telephone includes volume and on/off controls for the speakerphone accessory.

8. The speakerphone accessory of claim 1, further comprising an accessory microphone disposed inside the accessory housing and coupled to the control board.

9. A speakerphone accessory for use with a portable telephone, the portable telephone including a microphone, echo cancellation software, a user interface, and a power supply disposed inside a telephone housing and coupled to an input/output port, the speakerphone accessory comprising:

an accessory housing having a front wall and a rear wall joined by a side wall to form an enclosure, a central wall projecting from the rear wall into the enclosure having a first end covered by the rear wall and an open second end, and a first acoustic port and a second acoustic port extending through the rear wall;

a transducer attached and covering the second end of the central wall, thereby dividing the enclosure into a first acoustic chamber defined by the rear wall, the central wall, and the transducer, and a second acoustic chamber defined by the transducer, the central wall, the rear wall, the side wall, and the front wall, the first acoustic chamber fluidly coupled to the first acoustic port and the second acoustic chamber fluidly coupled to the second acoustic port;

a control board coupled to the transducer; and a connection port coupled to the control board and positioned for connection to the input/output port when the accessory housing is attached to the telephone housing.

10. The speakerphone accessory of claim 9, further comprising an auxiliary port coupled to the connection port.

11. The speakerphone accessory of claim 9, wherein dimensions of the first acoustic chamber are sized to provide a high frequency response.

12. The speakerphone accessory of claim 11, wherein the first acoustic port extends from the first acoustic chamber.

13. The speakerphone accessory of claim 11, wherein dimensions of the second acoustic chamber are sized to provide a low frequency response.

14. The speakerphone accessory of claim 13, wherein the second acoustic port extends from the second acoustic chamber.

15. A speakerphone accessory for use with a portable telephone, the speakerphone accessory comprising:

a speaker;

a housing having a front wall and a rear wall enclosing the speaker and defining an enclosure, the enclosure being divided into a first acoustic chamber coupled to the speaker and fluidly coupled to a first acoustic port, and a second acoustic chamber coupled to the speaker and fluidly coupled to a second acoustic port, an audio recess being formed in an exterior of the rear wall, the first and second acoustic ports residing in the audio recess.

16. The speakerphone accessory of claim 15, wherein the first acoustic port extends from the first acoustic chamber.

17. The speakerphone accessory of claim 16, wherein the second acoustic port extends from the second acoustic chamber.

18. The speakerphone accessory of claim 15, wherein the housing has a head portion and an intermediate portion joined by an indented neck portion.

19. The speakerphone accessory of claim 18, wherein the audio recess is located in the head portion.

20. The speakerphone accessory of claim 18, wherein the housing further includes a base, the base having a surface dimension sized to support the speakerphone accessory in an upright position.

* * * * *